United States Patent [19]
Geneste et al.

[11] Patent Number: 5,388,253
[45] Date of Patent: Feb. 7, 1995

[54] PROCESSING SYSTEM HAVING DEVICE FOR TESTING THE CORRECT EXECUTION OF INSTRUCTIONS

[75] Inventors: Michel Geneste, Marseille; Francois Jacob, Vence; Clement Poiraud, Cagnes Sur Mer, all of France

[73] Assignee: International Business Machines Corporation, Armonk, N.Y.

[21] Appl. No.: 749,848

[22] Filed: Aug. 26, 1991

[30] Foreign Application Priority Data

Oct. 31, 1990 [EP] European Pat. Off. ........... 90480173

[51] Int. Cl.⁶ .............................................. G06F 11/00
[52] U.S. Cl. ........................................ 395/575; 371/19
[58] Field of Search ................... 395/575, 500; 371/19, 371/24, 22.4, 15.1, 25.1

[56] References Cited

U.S. PATENT DOCUMENTS

| | | | |
|---|---|---|---|
| 4,688,222 | 8/1987 | Blum | 371/25.1 |
| 4,841,434 | 6/1989 | Mathewes et al. | 364/200 |
| 4,897,842 | 1/1990 | Herz et al. | 371/22.4 |
| 4,920,538 | 4/1990 | Chan et al. | 371/19 |
| 4,924,469 | 5/1990 | Tamaru et al. | 371/22.4 |
| 5,101,344 | 3/1992 | Bonet et al. | 395/575 |
| 5,113,503 | 5/1992 | Sasaki et al. | 395/575 |
| 5,157,782 | 10/1992 | Tuttle et al. | 395/575 |

OTHER PUBLICATIONS

Warter et al "A Software Based Approach to Achieving Optimal Performance for Signature Control Flow Checking" IEEE 1990 pp. 442–449.
Michael A. Schuette "Processor Control Flow Monitoring Using Signatured Instruction Streams" pp. 264–275 IEEE 1987.
B. Ramamurthy 'Controllable Signature Check Pointing Scheme for Transient Error Detection' pp. 899–900 IEEE 1990.
"Microcode Integrity Checking", IBM Technical Disclosure Bulletin, vol. 20, No. 11B, Apr. 1978, pp. 4838–4839.

Primary Examiner—Robert W. Beausoliel, Jr.
Assistant Examiner—Albert Decady
Attorney, Agent, or Firm—Robert M. Carwell

[57] ABSTRACT

Processing system for interpreting and carrying out a set of logically related instructions stored into a software program, the execution of a given instruction by the processing system involving the decoding and the execution of a corresponding set of microcommands. The processing system stores a signature portion corresponding to the macrocommand portion of a given instruction which is to be interpreted and executed, and signature data in response to the actual decoding and execution process of the microcommands involved in the execution of the instruction. The processing system further compares the computed signature data with the signature portion in order to detect the occurrence of an error in the decoding and execution process of the given instruction. In one embodiment of the invention, the processing system is such that one instruction is interpreted and executed in one elementary machine cycle. In a second embodiment of the invention, the execution of a given instruction involves the succession of multiple elementary machine cycles.

11 Claims, 6 Drawing Sheets

| PICOCOMMANDES \ CYCLE | 1 | 2 | 3 | 4 | 5 |
|---|---|---|---|---|---|
| Z BUS TO B REG | 1 | 0 | 0 | 0 | |
| Z BUS TO A REG | 0 | 1 | 0 | 1 | |
| B REG TO OPERATOR | 0 | 0 | 1 | 0 | |
| A REG TO OPERATOR | 0 | 0 | 1 | 0 | |
| ADD | 0 | 0 | 1 | 0 | |
| SUBTRACT | 0 | 0 | 0 | 0 | |
| AND | 0 | 0 | 0 | 0 | |
| OR | 0 | 0 | 0 | 0 | |
| XOR | 0 | 0 | 1 | 0 | |
| OPERATOR TO Z REG | 0 | 0 | 0 | 0 | |
| Z REG TO Z BUS | 1 | 1 | 0 | 0 | |

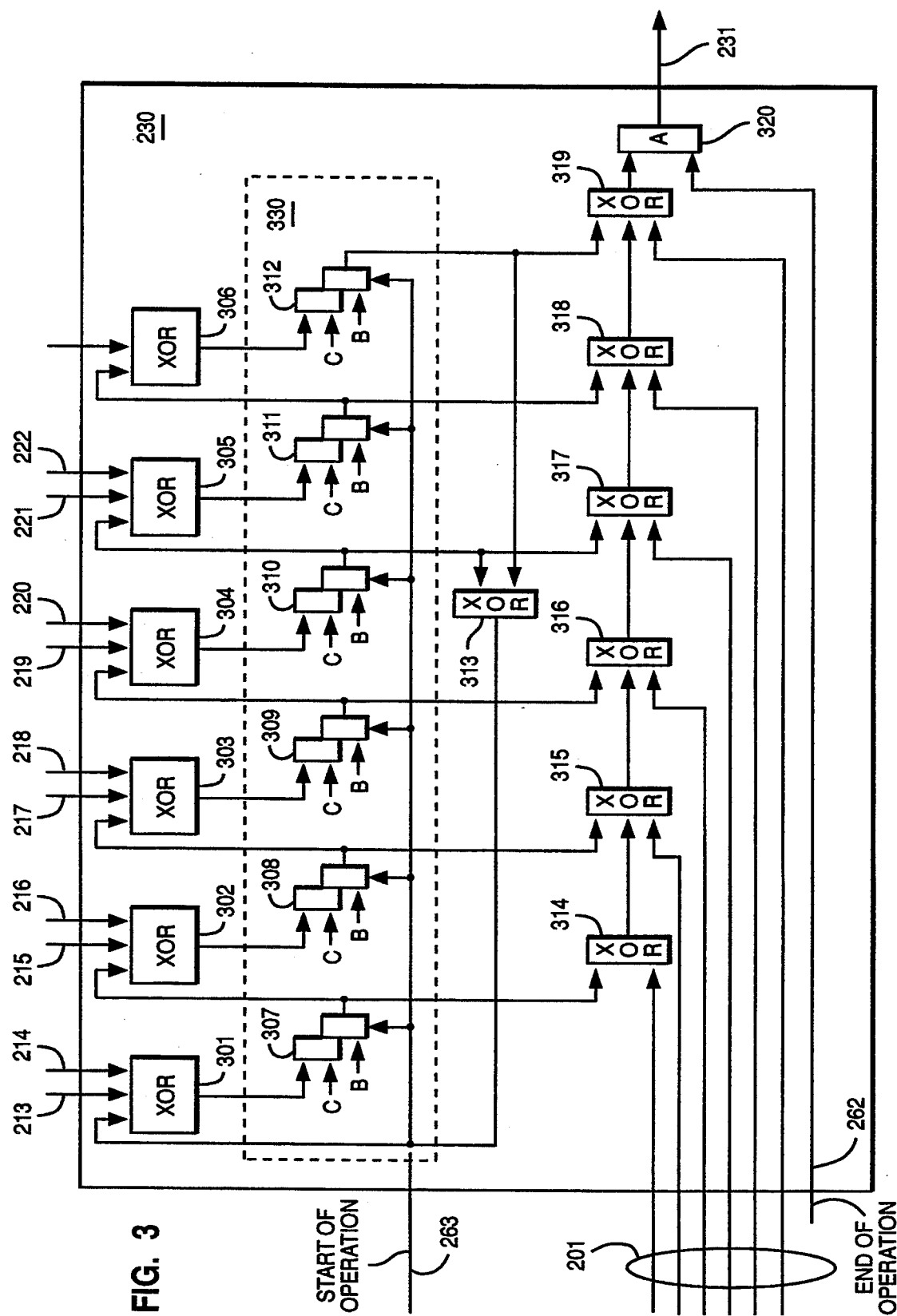

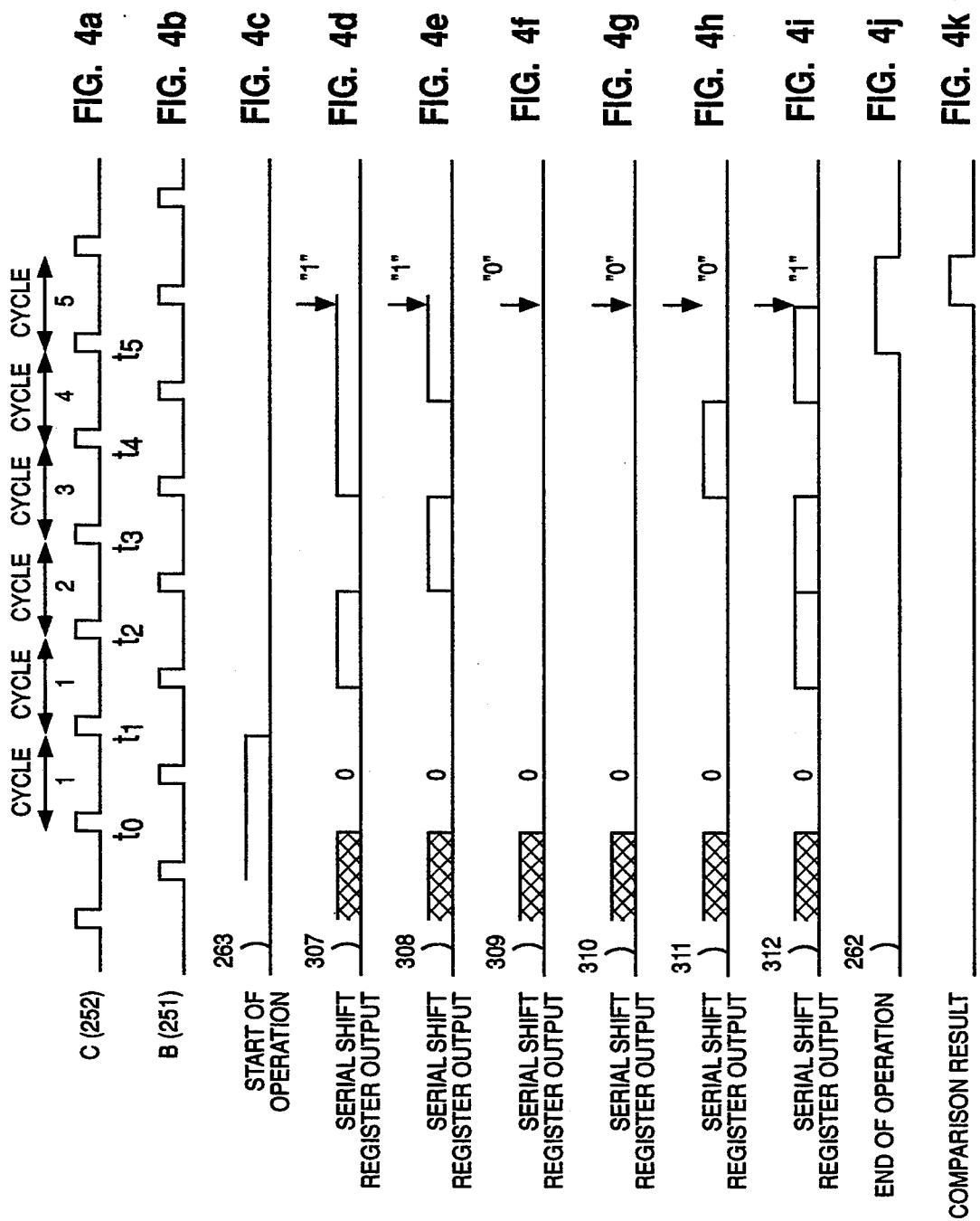

PROCESSING SYSTEM HAVING DEVICE FOR TESTING THE CORRECT EXECUTION OF INSTRUCTIONS

TECHNICAL FIELD OF THE INVENTION

The invention relates to data processing systems and more particularly to devices for testing the internal working of processors.

BACKGROUND ART

The major components of all processors or microprocessors are called the hardware. However, besides the hardware, a microprocessor has its instruction set or software, a particular set of logically related instructions stored in memory, being referred to as an application program or more generally a program. The microprocessor "reads" each instruction from memory in a logically predeterminate sequence, and uses it to initiate processing actions such as arithmetic, data transfer, branching, logic, and input/output (I/O). More accurately, when a processor "reads" a given instruction from the memory, it stores it into an instruction register in order to interpret it and carry it out. For that purpose, the control logic included into the processor first looks at the (macro)command portion of the instruction and interprets it or decodes it to determine what to do next. If the instruction is add, subtract, load, or output, the control logic first uses the address in the instruction register—the address associated with the command in the instruction word—and reads the word from that addressed location in memory; it then proceeds to load the word into the arithmetic unit, add it or subtract it from the number in the arithmetic unit, or transfer it to the output device, depending on the command. The addition of a "word" to the number in the arithmetic unit generally involves the storage of those operands in two registers associated with the Arithmetic Logic Unit (ALU): the accumulator and the temporary register. The accumulator is loaded from the internal bus and can transfer data to the internal bus. The temporary register stores one of the operands during a binary operation. For example, if the contents of register B are to be added to the contents of the accumulator, the temporary register holds a copy of the contents of register B while the arithmetic operation is taking place. It therefore appears that the decoding of a given (macro)command of an instruction by the control logic provides a set of elementary microcommands which, when carried out achieves the processing action corresponding to the considered macrocommand.

A problem has appeared in the fact that in some occasions, a processor erroneously interprets and decodes a given instruction, what entails an erroneous corresponding processing action. Error detecting and correcting devices exist in the data processing art. They provide the detection and correction of errors which have appeared in the data stored into a memory generally by means of a Frame Checking Sequence (FCS). However, if those devices are well appropriate to detect and correct an error which has been introduced into a given frame of data, they are unable to detect a wrong execution of a given command by a processor which has to interpret and decode it.

Therefore, a need has appeared for a device which provides the detection of an error in the decoding and the execution of a given instruction by a processor.

SUMMARY OF THE INVENTION

It is an object of the invention to provide device for detecting an erroneous execution of a given instruction by a processor.

It is another object of the invention to provide a device which substantially improves the reliability of operation of a processing system.

It is a further object of the invention to provide an apparatus for checking the microprocessor operation.

These and other objects are provided by means of the processing system according to the present invention which is intended to interpret and carry out a set of logically related instructions which are stored into a software program. The processing system includes means for storing a signature portion corresponding to the macrocommand portion of a given instruction which is to be interpreted and executed, and means for computing a signature data in response to the actual decoding and execution process of the microcommands involved in the execution of the corresponding instruction. The processing system according to the present invention further includes means for comparing the computed signature data with the contents of the signature portion and therefore detects the occurrence of an error in the decoding and execution process of the given instruction. In a preferred embodiment of the invention, the processing system is characterized in that one instruction is interpreted and executed in one elementary machine cycle.

In a second preferred embodiment of the invention, the processing system is such that one instruction is interpreted and executed in multiple elementary machine cycles.

DESCRIPTION OF THE DRAWINGS

FIG. 3 illustrates the checker 230 used in the second preferred embodiment of the invention.

FIG. 4 illustrates timing diagrams representative of the operating of checker 230 included into a preferred embodiment of the invention.

DESCRIPTION OF THE INVENTION

Figure 1A:
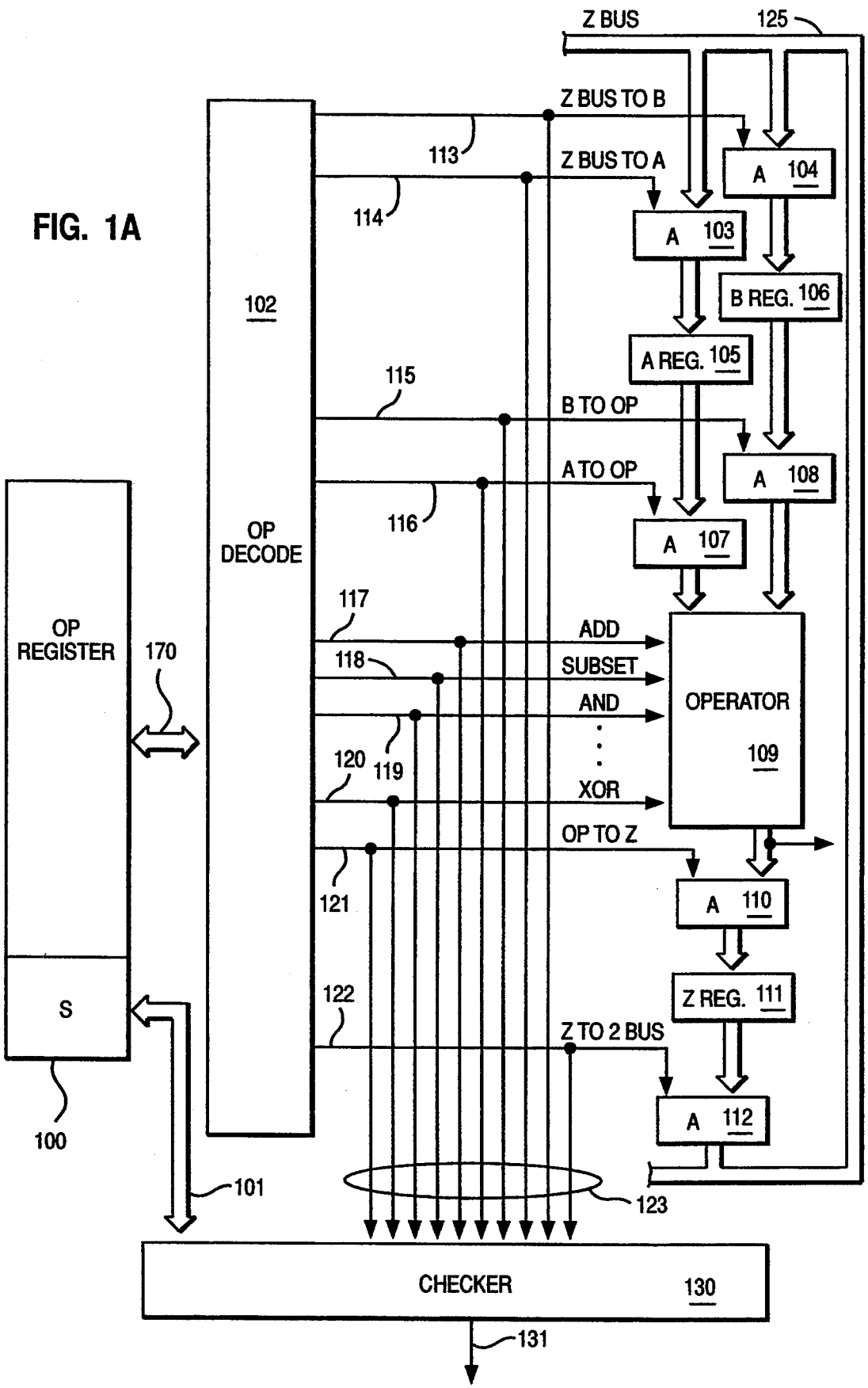
FIG. 1A is a preferred embodiment of a processor which incorporates the error detecting device according to the present invention.

FIG. 1A illustrates a preferred embodiment of the processor according to the present invention in which a determined command or macrocommand is executed in one elementary cycle, The processor has an Operation register 100 including the command portion of a given instruction, The OP register 100 particularly contains a first part in which is stored a macrocommand defining the type of the instruction. The contents of the macrocommand can be transmitted to an Operation (OP) decode circuit 102 through a bus 170, OP decode circuit 102 includes combinatory logic circuits which are well known in the art for providing a set of microcommands leads 123, For clarity's sake, only microcommands on leads 113–122 have been illustrated. It should however be noticed that the invention is not limited to this specific set of microcommands leads, A AND gating 103 permits the transmission of the data carried by a Z bus 125 to the input of a A register 105 on the occurrence of a "Z bus to A" microcommand 114 pulse. Similarly, a AND gating 104 provides the transmission of the contents of Z bus 125 to the input of a B register 106 whenever "Z bus to B" microcommand 113 is ON. A AND gating 107 also produces the transfer of the contents of A register 105 to a first input of an operator unit 109 in response to the occurrence of a "A to OP" microcommand 116. A AND gating 108 further produces the transfer of the contents of B register 106 to a second input of operator unit 109 in response to the occurrence of a "B to OP" microcommand 115. Operator unit 109 performs arithmetic or logic functions under control of OP decode circuit 102 via microcommands leads 117–120. Whenever an "ADD" microcommand lead 117 is active while the other microcommand leads 118-119-120 are inactive, operator unit 109 performs an addition of the outputs of gatings 107 and 108, the result being transmitted to the input of a AND gating 110, the latter gating 110 being under control of a "OP to Z" microcommand lead 121. Whenever a "SUBST" microcommand lead 118 is active while the other microcommands 117, 119, 129 and 121 are inactive, operator unit 109 performs a subtraction of "word" at the output of gating 108 to the output of gating 107 and produces the corresponding result to the input of gating 110. Whenever a "AND" microcommand lead 119 is active while the other microcommand leads 117, 118, 120 are inactive, operator unit performs a AND of the outputs of gating 107 and 108, the result being transmitted to the input of gating 110. At last, whenever a "XOR" microcommand lead 120 is active while the other leads 117-118-119 are inactive, operating unit 109 performs a XOR logic operation of the outputs of gatings 107 and 108, the result of the latter operation being transmitted to the input of gating 110. According to the state of "OP to Z" microcommand lead 121, the result computed by operating unit 109 is transmitted through gating 110 to a Z register 111. The output of Z register 111 is connected to the input of a gating 112 with another input connected to a "Z to Z bus" microcommand lead 122. Upon occurrence of an active signal on microcommand 122, gating 112 transmits the contents of Z register 111 to Z bus 125.

A correct execution of a given macrocommand stored into OP register 100 necessitates that OP decode circuit 102 activates some of the above microcommands. For instance, if the contents of A register 107 is to be added to the contents of B register 108, a simultaneous activation of the following microcommand leads in one elementary cycle is required: "A to OP" microcommand lead 116, "B to OP" microcommand lead 115, "ADD" microcommand lead 117 and "OP to Z" microcommand lead 121; while the other microcommands leads are to be disactivated. If one of the above microcommand has unfortunately not the appropriate state during the execution of a given instruction, the processor will compute an erroneous result in Z register 111. As mentioned above, such an error which has occurred during the execution of a given macrocommand can not be detected by common error detecting and correcting devices.

For the detection of one error in the execution process of a given instruction, the processor according to the present invention further includes a checker 130 which is connected to a second part of OP register 100.

The second part of register 100 contains a signature field S in which is stored a data characteristic of the type of the macrocommand which is to be decoded and carried out by the processor. As will be explained in detail hereinafter, the data stored into the second part of OP register 100 consisting of the signature field is used in order to check the actual decoding and execution of the macrocommand. The size of the signature field, i.e. the number of bits which are included therein, depends on the type of errors that the user or the user program wishes to detect: a single error or a multiple error in the microcommands 113–122. A one-bit-signature is particularly adapted for detecting a single error in the decode process of a macrocommand while a multiple-bit-signature should be used for multiple errors. Checker circuit 130 is connected to all microcommand leads 113-122 by means of a bus 123. In the decode and execution process of a given macrocommand stored into OP register 100, checker circuit 130 computes a signature from the actual state of the microcommands generated by OP decode circuit 102. Then, it compares the computed signature with the data which is stored in the signature field of OP register 100. According to the result of the latter comparison, checker circuit 130 outputs an error signal to lead 131 indicating that an error has occurred in the decoding and execution of the macrocommand in case of mismatch. An error signal appearing on lead 131 may be used by the application program in order to initiate a retry procedure which results in a second generation of the macrocommand which was not correctly executed. In another embodiment of the invention, the occurrence of an error signal on lead 131 is stored into an error register (not shown) which will be read later on.

Figure 1B:
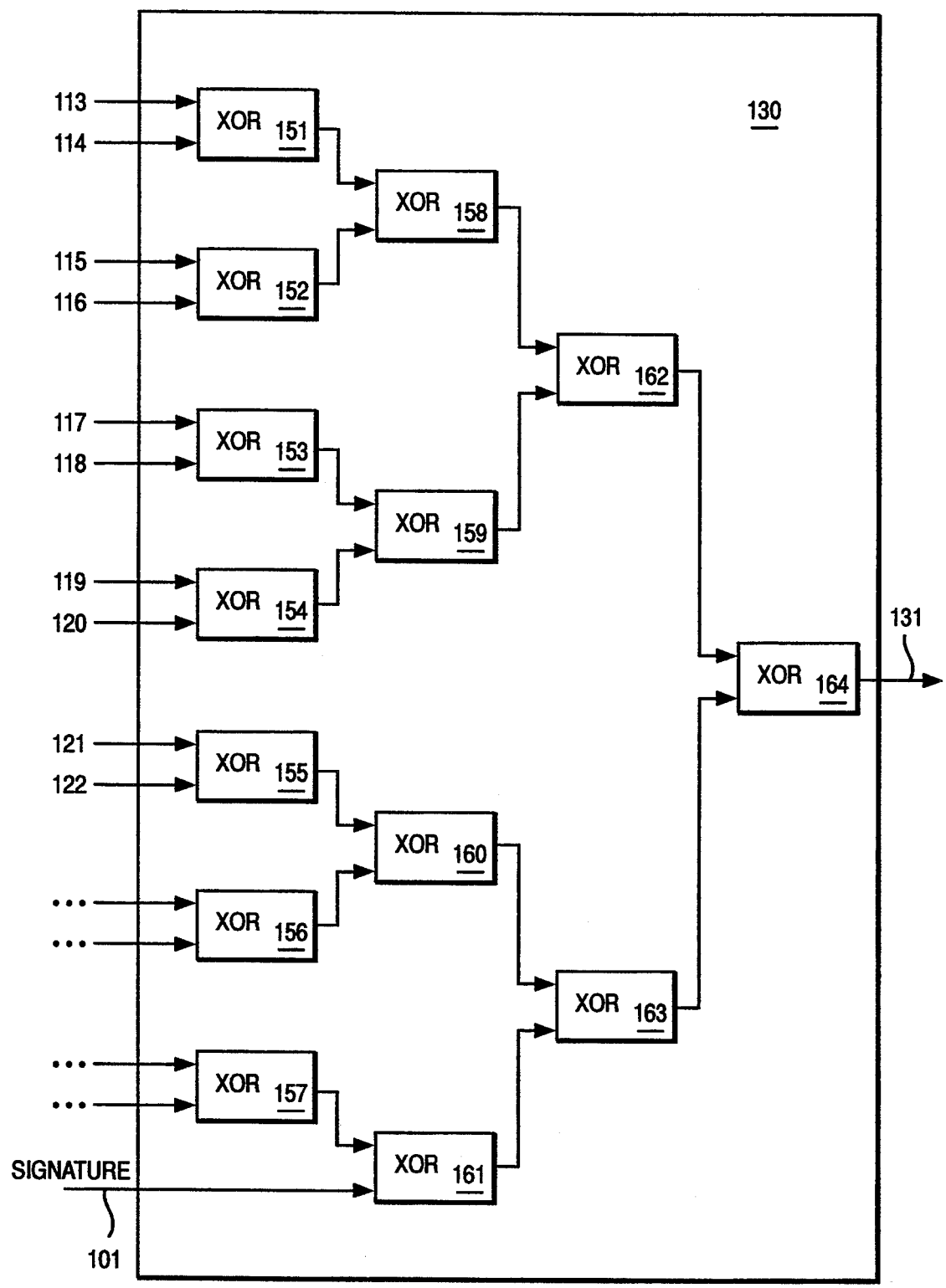
FIG. 1B is an example of an embodiment of the checker 130 in the error detecting device according to the invention.

FIG. 1B shows an example of an embodiment of the checker 130 included in the error detecting device according to the present invention. In this particular embodiment, the signature is limited to a 1-bit-signature for simplicity purpose. The checker 130 includes a parity tree consisting of XOR gates 160–164, the output of XOR gate 164 producing the above mentioned error signal on lead 131 whenever the states of the microcommands 113–114 (and the other not illustrated microcommands) do not match the 1-bit-signature that is stored into the signature field of OP register 100. "Z bus to A" microcommand on lead 114 and "Z bus to B" microcommand on lead 113 are respectively transmitted to the two inputs of a XOR gate 151, the output of which being connected to a first input of XOR gate 158. "A to OP" microcommand on lead 116 and "B to OP" microcommand on lead 115 are respectively transmitted to the two inputs of a XOR gate 152, the output of which being connected to a second input of XOR gate 158. Similarly, "ADD" microcommand on lead 117 and "SUBT" microcommand on lead 118 are respectively transmitted to the two inputs of a XOR gate 153, the output of which being connected to a first input of a XOR gate 159. Further. "AND" microcommand on lead 119 and "SUBT" microcommand on lead 120 are respectively transmitted to the two inputs of a XOR gate 154, the output of which being connected to a second input of a XOR gate 159. "OP to Z" microcommand on lead 121 and "Z to Z bus" microcommand on lead 122 are respectively transmitted to the two inputs of a XOR gate 155, the output of which being connected to a first input of a XOR gate 160. XOR gates 156 and 157 have their inputs connected to further microcommand leads (not shown) and their output respectively connected to the second input of XOR gate 160 and a first input of XOR gate 161. At last, the 1-bit-signature stored into the signature field of the OP register 100 is transmitted via (1-bit) bus 100 to a second input of XOR gate 161. XOR gates 158 and 159 have an output respectively connected to a first and second input of a XOR gate 162. Similarly, XOR gates 160 and 161 have an output which is respectively connected to a first and second input of a XOR gate 164, the output lead 131 eventually carries the error signal.

Figure 2A:
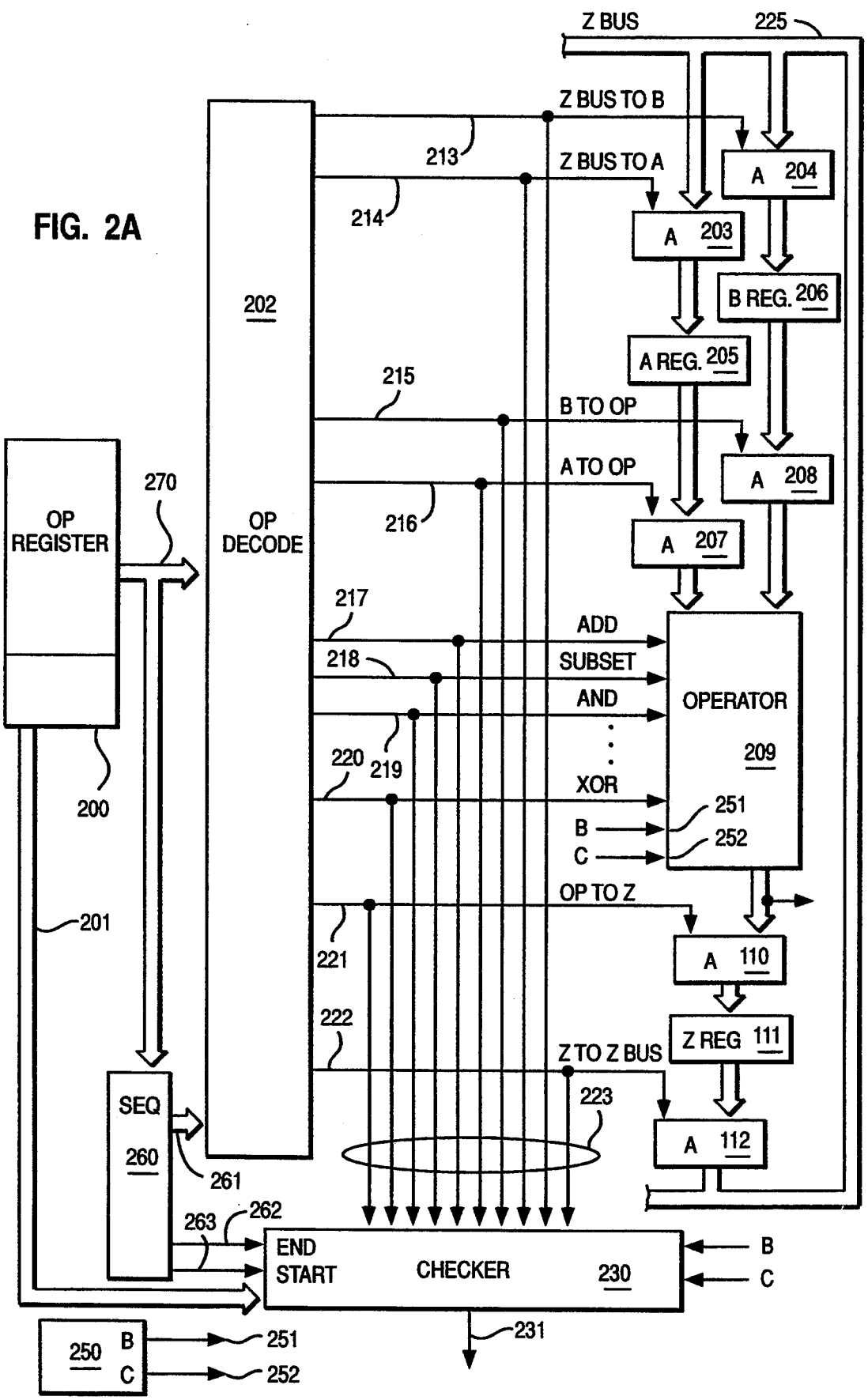
FIG. 2A illustrates a second preferred embodiment of the invention.

FIG. 2A shows a second preferred embodiment of the processor according to the present invention in which the execution of a given macrocommand involves multiple machine cycles. Similarly than above, the processor has an Operation register 200 including the macrocommand portion of a given instruction which can be transmitted either to an Operation (OP) decode circuit 202 and to a sequencing circuit 260 through a bus 270. As for above, according to the macrocommand carried by bus 270, OP decode circuit 202 provides a set of microcommands on a bus 223 including leads 213-222. An AND gating 203 permits the transmission of the data carried by a Z bus 225 to the input of an A register 205 on the occurrence of a "Z bus to A" microcommand 214 pulse. Similarly, a AND gating 204 provides the transmission of the contents of Z bus 225 to the input of a B register 206 whenever "Z bus to B" microcommand on lead 213 is ON. A AND gating 207 also produces the transfer of the contents of register A 205 to a first input of an operator unit 209 in response to the occurrence of a "A to OP" microcommand 216. An AND gating 208 further produces the transfer of the contents of register B 106 to a second input of operator unit 209 in response to the occurrence of a "B to OP" microcommand 215. Operator unit 209 performs arithmetic or logic functions under control of OP decode circuit 202 via microcommands leads 217-220. Whenever an "ADD" microcommand lead 217 is active while the other microcommand leads 218-219-220 are inactive, operator unit 209 performs an addition of the outputs of gatings 207 and 208, the result being transmitted to the input of an AND gating 210, the latter gating 210 being under controlled of a "OP to Z" microcommand lead 221. Whenever a "SUBST" microcommand lead 218 is active while the other microcommands 217, 219, 229 and 221 are inactive, operator unit 209 performs a subtraction of the "word" at the output of gating 208 to the output of gating 207 and produces the corresponding result to the input of gating 210. Whenever a "AND" microcommand lead 219 is active while the other microcommand leads 217, 218, 220 are inactive, operator unit performs a AND of the outputs of gating 207 and 208, the result being transmitted to the input of gating 210. Whenever a "XOR" microcommand lead 220 is active while the other leads 217-218-219 are inactive, operating unit 209 performs a XOR logic operation of the outputs of gatings 207 and 208, the result of the latter operation being transmitted to the input of gating 110. Operating unit 209 is clocked by means of two B and C clock signals on leads 251 and 252, the latter clock signals being produced by a clock circuit 250. According to the state of "OP to Z" microcommand lead 221, the result computed by operating unit 209 is transmitted through gating 210 to a Z register 211. The output of Z register 211 is connected to the input of a gating 212 which has a second input connected to a "Z to Z bus" microcommand lead 222. Upon occurrence of a active signal on microcommand lead 222, gating 212 transmits the contents of Z register 211 to Z bus 225.

According to the macrocommand stored into the first part of OP register 200, sequencing circuit 260 generates a succession of data which is transmitted to OP decode circuit 202 via a bus 261. The succession of data on bus 261 causes OP decode circuit 102 to generates a succession of microcommands at the output leads 213-222, the latter succession performing the desired processing action. The data transfer is clocked by B and C clocks. The C clock signal on lead 252 has the same frequency than the B clock signal, but is delayed with respect to the B clock as illustrated in FIG. 5a and 5b.

Figure 2B:
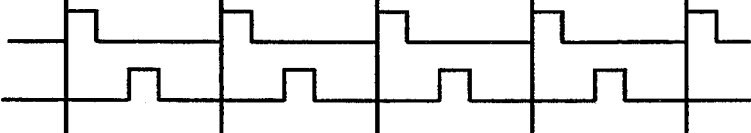
FIG. 2B illustrates an example of a decoding process of a macrocommand into a set of microcommands.

FIG. 2B illustrates the four cycles which are involved in the decoding process of a macrocommand which corresponds to the addition of two "words", the result of the addition being stored into the A register 205.

With respect to FIG. 2A again, the detection of an error which has occurred in the execution process of a given macrocommand is achieved by means of a checker 230 which receives the data stored into the signature field of OP register 200. Checker circuit 230 is connected to the microcommand leads 213-222 by means of bus 223 and also receives a "start of operation" signal on a lead 263 and a "end of operation" signal on a lead 262 from sequencing circuit 260. Checker circuit 230 also receives B and C clocks signals. At the beginning of a decoding process of a given macrocommand, sequencing circuit 200 produces a "start of operation" signal on lead 263 which is transmitted to checker 230. The latter signal authorizes checker 230 to perform the computation of the signature in accordance with the actual state of the microcommands on leads 213-222. When the decoding process is supposed to be completed, sequencing circuit 260 generates a "end of operation" signal on lead 262 which causes checker 231 to output the result of the comparison between the computed signature and the data stored into the signature field of OP register 200.

FIG. 3 illustrates the checker 230 used in the second preferred embodiment of the invention. Checker 230 includes a set of XOR gates 301-307 which captures the state of the microcommand leads 213-222 at every elementary cycle. Checker 230 also includes a serial shift SR register 330 which is made up of a set of polarity hold latches 307-312 having a static reset input lead connected to the "start of operation" lead 263. SR latch 307 ( resp. 308, 309, 310, 311, 312 ) has an input connected to the output of XOR gate 301 (resp. 302, 303, 304, 305, 306) and an output connected to a first input of XOR gate 302 (resp. 303, 304, 305, 306, 313). SR latches 307-312 also receive the B and C clock signal coming from leads 251 and 252. XOR gate 313 has a second input which is connected to the output of SR latch 310 and has an output lead connected to a first input of XOR gate 301. XOR gate 301 (resp. 302, 303, 304, 305) has a second input connected to microcommand lead 213 (resp. 215, 217, 219) and a third input lead connected to microcommand lead 214 (resp. 216, 218, 220). XOR gate 306 has a second input lead which is connected to a further (not illustrated) microcommand lead. SR latch 307 ( resp. 308, 309, 310, 311 and 312) has its output connected to a first input of a XOR gate 314 (resp. 315, 316, 317, 318, 319) which has a second input connected to a first lead of signature bus 201 (resp. a second, a third, a fourth, a fifth, a sixth). XOR gate 315 (resp. 316, 317, 318 and 319) has a third input connected to the output of XOR gate 314 (resp. 315, 316, 317, 318). XOR gate 319 has an output which is connected to a first input of a AND gate 320, a second input of which being connected to the "end of operation" lead 262 coming from sequencing circuit 260. AND gate 231 outputs the error signal whenever the signature computed by XOR gates 301–306 and 311 does not match the data stored into the signature field of OP register 200 and transmitted via bus 201 to the set of XOR gates 314–319. It should be noticed that in the second preferred embodiment of the invention the size of the signature field has been fixed to a number of six bits. However, the invention does not limit to this size of signature field. Checker 230 operates as follows with respect to figure 3 and 4: At the beginning of macrocommand execution process, sequencing circuit 260 transmits a "start of operation" signal on lead 263 (in synchronism with a C clock pulse such as shown in FIG. 4a-4b-4c) to reset the contents of serial shift register 330. Then, at every C/B clock pulses, the serial shift register 330 captures the actual values of the microcommands on leads 213–222 representative of the actual execution of the considered macrocommand through XOR gate 301–306. Since the output of latch 307 (resp. 308,....) is transmitted to the input of XOR gate 302 (resp. 302, ...), the contents of serial shift register 330 which is computed at the nth pulse of the C/B clock is combined with the values of the microcommands at the (n+1)th pulse of the C/B clock. FIG. 4d–4i illustrates an example of a successive evolution of the contents of serial shift register in accordance with the values of the microcommands (cycle 1-2-..-5). When the execution of a given macrocommand completes, the serial shift register 330 stores a computed data which consists of a signature closely depending on the history of the evolution of every microcommands during the 5 machine cycles. At the completion of the desired macrocommand, sequencing circuit 260 generates a "end of operation" signal on lead 262 such as illustrated in FIG. 4j (fifth cycle). From this instant, the result of the signature computation is available from the contents of serial shift register 330 and can be compared to the data carried on data bus 201 by means of XOR gates 314–319. The result of the latter comparison is then transmitted to the output lead 231 of AND gate 320 and can be used by the general application program.

It should be noticed that serial shift register 330 of the preferred embodiment of the invention includes polarity hold latches 307–312 but that the invention should not be limited to such latches. Moreover, in the case when such latches are used, it could be advantageous to take profit of them in order to implement the processor according to the invention with a Level Sensitive Scan Design (LSSD) technology well known in the art.

We claim:

1. Processing system for interpreting and carrying out a set of logically related instructions stored into a software program, an execution of a given instruction by said processing system involving the decoding and the execution of a corresponding set of microcommands, characterized in that it includes:
    means for storing a signature portion corresponding to a macrocommand portion of a given instruction which is to be interpreted and executed;
    means for computing a signature data functionally related to a combination of decoded and executed microcommands involved in the execution of said given instruction; and
    means for comparing said computed signature data with said signature portion in order to detect the occurrence of an error in the execution of said given instruction.

2. Processing system according to claim 1 characterized in that one instruction is interpreted and executed in one elementary machine cycle.

3. Processing system according to claim 1 characterized in that one instruction is interpreted and executed in multiple elementary machine cycles.

4. Processing circuit according to claim 2 characterized in that it further includes:
    means for decoding said macrocommand portion of said given instruction in order to control a plurality of microcommand leads;
    means for receiving said signature portion and said plurality of microcommand leads;
    means including XOR gates assembled in a parity tree, for computing a signature data representative to the actual execution of a plurality of microcommands; and
    means for comparing said computed signature data with said signature portion in order to detect the occurrence of an error in the execution of said given instruction.

5. Processing system according to claim 3 characterized in that it further includes:
    means for decoding said macrocommand portion of said given instruction in order to generate a succession of microcommand signals;
    sequencing means for receiving the command portion of said given instruction for controlling the successive generation of said microcommand signals;
    means for computing a signature data corresponding to the actual generated microcommand leads; and
    means for comparing said computed signature data with said signature portion in order to detect the occurrence of an error in the execution of said given instruction.

6. Processing system according to claim 5 characterized in that:
    said computing means further includes a set of XOR gates for capturing the state of the microcommand signals generated at every elementary cycle by said decoding means, and a serial shift register including latches, each of said latch having an input connected to the output of a XOR gate and an output connected to the input of following XOR gate of said set of XOR gates; and
    said comparing means further includes a second set of XOR gates connected in series, each of said XOR gates having an input connected to the output of a corresponding latch of said serial shift register and further receiving the contents of one bit of said signature portion.

7. A method for interpreting and carrying out a set of logically related instructions stored into a software program, an execution of a given instruction by said processing system involving the decoding and the execution of a corresponding set of microcommands involved in said execution of a given instruction, comprising the steps of:
    storing a signature portion corresponding to a macrocommand portion of a given instruction which is to be interpreted and executed;
    computing a signature data functionally related to a combination of decoded and executed said microcommands; and comparing said computed signature data with said signature portion in order to detect the occurrence of an error in said execution of said given instruction.

8. The method of claim 7 characterized in that one instruction is interpreted and executed in one elementary machine cycle.

9. The method of claim 7 characterized in that one instruction is interpreted and executed in multiple elementary machine cycles.

10. The method according to claim 9 further comprising the steps of:
decoding said macrocommand portion of said given instruction in order to control a plurality of microcommand leads;
receiving said signature portion and said plurality of microcommand leads;
computing a signature data representative to the actual execution of a plurality of microcommands; and
comparing said computed signature data with said signature portion in order to detect the occurrence of an error in the execution of said given instruction.

11. The method of claim 9 further comprising the steps of:
decoding said macrocommand portion of said given instruction in order to generate a succession of microcommand signals;
receiving the command portion of said given instruction for controlling the successive generation of said microcommand signals;
computing a signature data corresponding to the actual generated microcommand leads; and
comparing said computed signature data with said signature portion in order to detect the occurrence of an error in the execution of said given instruction.

* * * * *